United States Patent Office 3,127,239  
Patented Mar. 31, 1964

3,127,239  
METHOD OF SEPARATION  
George W. Cook, Benton, Ark., assignor to Reynolds Metals Company, Richmond, Va., a corporation of Delaware  
No Drawing. Filed June 14, 1960, Ser. No. 35,877  
5 Claims. (Cl. 23—143)

This invention relates to a novel method for the sedimentation or thickening of metallurgical, mineralogical and chemical pulps, and for separation of these pulps from their accompanying liquors. More particularly, the invention concerns a novel method for the extraction of alumina values from aluminous ores of the bauxite type employing as a flocculant a homogenized gelatinized starchy material.

The novel method of this invention is applicable to the treatment of a wide variety of metalliferous and other ores and minerals, and to the sedimentation or thickening of metallurgical and chemical pulps and slimes of various kinds, such as, for example, lead flotation concentrates, cyanide process slimes derived from milling of gold bearing ores, and pulps obtained in the extraction of aluminous ores. For a better understanding of the invention, the novel method will be illustrated in detail with reference to the processing of aluminous ores, particularly ores of the bauxite type.

The term bauxite is generally used to designate a natural aggregate of aluminum-bearing minerals, more or less impure, in which the aluminum occurs largely as hydrated oxides. The aggregate results from the weathering of parent aluminum bearing igneous or sedimentary siliceous rocks. In the weathering process the siliceous rocks, such as, for example, limestones containing clay minerals, tend to lose such constituents as silica, magnesia, potash and soda, and to leave behind a residue richer in alumina, iron oxide and titanium oxide than the original rock. For commercial purposes, bauxites are often grouped as (1) white or normal bauxites, containing from 55% and upward of alumina ($Al_2O_3$), the bauxite being white, gray or cream in color, with iron content as $Fe_2O_3$ not exceeding about 5%, and (2) red or ferruginous bauxites, also known as terra rosa, with an alumina content of about 50% upwards to about 54%, with $Fe_2O_3$ content ranging from 10% to 25%, the color being yellow, brown or red. The alumina in bauxite of both types occurs as the trihydrate $$Al_2O_3 \cdot 3H_2O$$

Caribbean bauxites, including both Jamaica and Haiti bauxites, are of the ferruginous variety, forming a soft to moderately hard, extremely fine grained earthy material that is highly permeable and porous, ranging in color from light yellow, through tan to reddish brown and dark red. The alumina content in general averages around 50%, that of iron as $Fe_2O_3$ about 20%.

Whereas a typical composition of bauxite mined in the United States would be: $Al_2O_3$ 55.59–64.91%, $Fe_2O_3$ 0.28–6.08%, $SiO_2$ 0.62–10.13%, $TiO_2$ 1.05–3.50%, combined water 28.99–33.00%, the chemical composition of typical Caribbean bauxites would fall within the ranges shown in Table 1:

TABLE 1.—CHEMICAL COMPOSITION OF CARIBBEAN TERRA ROSA BAUXITE

| | Jamaica | Haiti | Dominican Republic |
|---|---|---|---|
| | Percent | Percent | Percent |
| $SiO_2$ | 0.4–3.5 | 2.4–5.3 | 1.55–5.17 |
| $TiO_2$ | 2.4–2.6 | 2.3–3.1 | 2.50–2.75 |
| $Al_2O_3$ | 46.4–50.3 | 42.6–49.4 | 46.25–48.53 |
| $P_2O_5$ | 0.3–2.8 | 0.3–0.8 | 0.13–0.26 |
| $Fe_2O_3$ | 17.5–22.8 | 20.8–23.5 | 19.43–20.11 |
| $MnO_2$ | [1] ND | 0.4–0.7 | 0.13–0.56 |
| $MgO$ | ND | 0.04–0.18 | ND |
| $CaO$ | 0.1–1.2 | trace–0.18 | ND |
| $H_2O$ (below 110° C.) | ND | 1.8–2.6 | 0.73–1.53 |
| Loss on Ignition | 26.0–27.8 | 20.1–25.8 | 23.43–26.55 |

[1] Not determined.

Source: Bauxite Resources of Jamaica and Their Development, V. A. Zans, Colonial Geology and Mineral Resources, vol. 3, pp. 302–333 (1952).

The Caribbean bauxites possess special characteristics not possessed by other types of bauxites, including extremely fine particle size, averaging about 0.2 micron, and a fine grained structure of the alumina and iron content which imparts a high degree of dispersibility, and a neutral or mildly acid reaction, in contrast to the alkaline character of other types of bauxite. These characteristics of Caribbean bauxites, when known sedimentation methods are applied to the pulps which are obtained in the normal processing of these ores, create difficulties.

The Bayer process is the most commonly used method for extracting alumina from bauxite. In accordance with the Bayer process, the ground bauxite is digested with an aqueous solution of an alkali, such as for example, caustic soda, or a mixture of caustic soda and sodium carbonate. There is obtained a slurry which comprises a suspension of the constituents of the bauxite other than alumina and which are insoluble, in the alkali solution or liquor. The liquor contains the alumina dissolved in the form of a supersaturated sodium aluminate solution. The constituents of the bauxite which remained unattacked during the alkali digestion form an insoluble solid residue, known as red mud. The chemical and physical character of the red mud will depend upon the mineralogical composition and particle size of the bauxite, digestion conditions such as temperature, pressure and agitation, the concentration and the proportion of caustic solution used, and the time of digestion.

For recovery of the alumina, the sodium aluminate solution or liquor is separated from the red mud by filtration or sedimentation or by a combination of both. The clarified liquor comprises an unstable solution of alumina from which most of the dissolved alumina is precipitated by seeding with alumina hydrate. The precipitated alumina hydrate is then separated from the liquor by sedimentation and filtration, washed, and calcined at high temperature to form alumina.

It is of paramount importance in the Bayer process that the separation of the red mud from the sodium aluminate liquor be complete. If the separation is not complete, some of the finely dispersed non-alumina constituents of the red mud such as iron oxide or titanium oxide will remain in suspension in the alumina solution, being precipitated subsequently with the alumina hydrate, contaminating the alumina and making the alumina unacceptable as a raw material for the production of aluminum metal and other products. The sodium aluminate solution is highly supersaturated in alumina content and therefore it is necessary that the separation of sodium aluminate from the insoluble red mud suspension be effected rapidly in order that no alumina precipitates during the separation, with resulting loss of recovery of valuable alumina from the ores. Moreover, any precipitated alumina will tend to form scale, clogging pipes and blocking filter media.

Most of the bauxites utilized commercially yield a large proportion of red mud, which is usually difficult to filter, and particularly so in the case of the Caribbean bauxites. Accordingly sedimentation is commonly employed as the first step in separation of the red mud from the liquor, followed by counter-current decantation and washing of the residues, together with a polishing filtration of the liquor. However, the red muds or digested residues of some types of bauxite have proved to be just as intractable to sedimentation as to filtration because of their small particle size and fine state of suspension.

Numerous flocculating agents for sedimentation of red mud have been proposed, and of these starch-bearing materials have been most widely adopted. Refined starch is usually preferred, but impure or crude starches may be employed where process economics so dictate. A typical starch flocculation process is that disclosed in U.S. Patent 2,280,998, wherein about 0.01 to 0.2 gram of starch per liter are added to the digest solution, and the flocculated red mud particles are removed by filtration or by sedimentation and decantation. The starches commonly employed as flocculants comprise granules derived from the grains of wheat, rice, corn, or potatoes. While they have provided reasonably satisfactory results with red muds of the white or normal bauxites, they have not proved effective flocculating agents, even when applied in comparatively large amounts, in the case of the red or ferruginous bauxites. Thus, the cost of starch has formed a very considerable item of expense for alumina producers processing Jamaican or Haitian bauxites, and efforts have been made in the industry to increase the effectiveness of the starch as a flocculating agent. Moreover, a successful way of increasing the effectiveness of starches as flocculants would enable the utilization of low grade starch materials such as dry-milled flours from corn, grain sorghum dry-milled flour, manioc dry-milled flour or meal, and other crude starch materials, which represent a considerably lower unit price than the refined starches. Up to the present time, the use of low-grade starchy materials for the flocculation of Jamaican or Haitian type bauxite residues has not been justified, despite the lower price of such starchy materials, because of their relative ineffectiveness as flocculants for these residues. The poor performance of the low-grade starches with these bauxites imposes the necessity of using much larger quantities to equal or even approach the flocculating power of the refined starches. But even the refined starches do not give entirely satisfactory performance as flocculants with these types of bauxite residues.

In accordance with the present invention it has been found that both refined starches and low-grade starchy materials of the type described may be transformed into flocculating agents of greatly increased effectiveness by gelatinization of the starch or starchy material, followed by homogenization of the gelatinized starch. It has been further found that homogenized gelatinized starch or starches obtained in accordance with the invention possess an effectiveness as flocculants for metallurgical, mineralogical and chemical pulps, and particularly for bauxite red muds, which is far superior to that of known starch flocculant preparations. The homogenized gelatinized starches develop faster sedimentation rates and compactions of a higher order than those heretofore obtainable, providing better settling and consolidation of red mud, and facilitating the washing of residues which have heretofore given difficulty even with refined starches.

In accordance with this invention, there is further provided a novel method for the extraction of alumina values from aluminous ores of the bauxite type, which employs the heightened flocculating power of homogenized gelatinized starch. This novel method has the advantages that it provides (1) savings in the amount of starch required, (2) increased capacity of existing mud sedimentation facilities, (3) better mud compaction and mud washing efficiency, with greater recovery of soluble components from the red mud, and (4) reduced evaporation of recycled liquor is required because of less dilution by washing.

In addition, the homogenization and gelatinization treatments render the low-grade inexpensive starchy materials as effective as the highly refined starches as flocculants, thereby permitting the use of the cheaper low-grade products both economically and efficiently in the treatment of Caribbean bauxites.

As employed in the present specification, the term gelatinized starch refers to the conversion of starch granules to the form of a paste, gel, or sol, depending upon the origin of the starch and upon its concentration, such gelatinization being accomplished by any of the methods commonly employed for this purpose, which are well known to those skilled in the art, including boiling or cooking in water usually at temperatures in the range of about 60° to 80° C., or pasting by means of steam jet cookers in which a starch slurry is impacted by expanding jets of steam at high velocity, and also including chemical methods, including treatment with caustic soda, organic bases such as ethylenediamine, or with dispersing agents which have the ability to break hydrogen bonds, such as ammonium thiocyanate. The term homogenized starch is used herein to refer to the product obtained by subjecting an aqueous gelatinized starch suspension to disruption by mechanical means, whereby there are applied to the starch particles high shearing or tearing stresses. Such homogenization may be carried out by means of extensive grinding or by treatment of the gelatinized starch in any suitable type of homogenizer device, such as a colloid mill, a high speed propeller, ultrasonic, grooved stator, or piston-orifice type.

In the preparation of the flocculating agents of the invention, there may be employed either refined corn, wheat, rice, or potato starch, such as for example, a refined corn starch commercially available under the designation Milo Maize. There may also be employed low-grade starchy materials including dry-milled flours derived from corn, such as, for example, those sold commercially under the designations Hi-Starch, M-60, and Shumaker yellow corn flour; or from grain sorghum dry-milled flour, such as the commercial product Adcol 100; or from manioc dry-milled flour, such as manioc meals, and the like. These low-grade starches on gelatinization and homogenization become as effective as the high grade or refined starches, resulting in marked economies when they are applied to sedimentation of red muds.

In the preparation of the starch flocculants in accordance with the invention, the particular starch selected is first gelatinized. For convenience, the preferred method of gelatinization is to subject the starch to the action of an alkali, such as, for example, sodium hydroxide. Thus, a gelatinized aqueous starch suspension is prepared by suspending in water at ordinary temperature, or at elevated temperatures up to boiling, from about 2% to about 10%, but preferably about 10% by weight of starch. A solution of a strong alkali, such as, for example, a 50% NaOH solution is then added to the aqueous starch suspension so that the composite suspension contains about 1% NaOH by weight, with agitation. As a means of agitation there may be employed any suitable mechanical stirrer, as for example, a blade-type stirrer running at about 1000 r.p.m. After about 5 minutes of stirring, the gelatinized starch preparation is ready for homogenization. The starch preparation at this stage is essentially the same as the types of starch flocculants commonly used for bauxite extraction, and may serve as a control against which to measure the effectiveness and the improved performance of the same starch preparation when further subjected to homogenization, in accordance with this invention.

In order to obtain the homogenized gelatinized starch flocculant of this invention, the foregoing starch preparation is homogenized, preferably in a device which will disrupt the starch granules by means of high shearing or tearing stresses. Thus, the starch suspension prepared as described may be homogenized using a high-speed propeller type homogenizer, of the type commercially available under the designations Osterizer or Waring Blendor. For example, the starch suspension is placed in a model 10 Osterizer (manufactured by the John Oster Co.) and dispersed by the rotating knife blades, rotating at 10,000 r.p.m. for 20 minutes. The resulting homogenized gelatinized starch suspension is then ready for use as an improved flocculant in accordance with this invention.

Similarly, the starch preparation may be homogenized by means of an ultrasonic type homogenizer, such as that available commercially under the designation Rapisonic. Thus, a freshly prepared causticized solution of a low-grade corn starch known as Hi-Starch was pumped through a small Rapisonic homogenizer at a rate of about 3 g.p.m. In this device the starch solution passes through a small orifice and impinges as a jet upon a tongue which presumably induces ultrasonic vibrations to attain the desired degree of dispersion. The treated starch preparation is then ready for use as an improved flocculant.

A homogenized gelatinized starch flocculant may also be prepared using any conventional type of colloid mill, such as for example, the commercially available Charlotte colloid mill. This mill consists of a vertically grooved conical stator into which a rotor fits leaving an adjustable clearance. The optimum clearance for starch homogenization is about 0.001 inch. Using this clearance and a rotor speed of 3600 r.p.m., the caustic starch suspension is pumped through the mill to give the desired homogenized preparation which serves as an improved flocculant.

The homogenized starch flocculant may also be prepared by subjecting the starch preparation above to homogenization in a plunger-orifice type homogenizer, such as, for example, the device commercially available under the designation of Manton-Gaulin mill. This machine is a positive displacement piston device which forces the starch slurry through a small orifice, thus providing shearing action and dispersion. The pressure is maintained slightly above 1000 p.s.i.g. The resulting homogenized starch suspension is suitable for use as an improved flocculant in accordance with this invention. The improved homogenized gelatinized starch flocculants prepared as described above are applied directly to the sedimentation of metallurgical mineral and chemical pulps.

The improved starch flocculant of this invention is applied for purposes of sedimentation in an amount corresponding to a starch loading of between about 5 and about 20 pounds of dry starch per ton of pulp to be treated, and preferably about 10 pounds of dry starch per ton.

Thus, in the treatment of red mud slurries from bauxite extraction, a 5% by weight starch suspension, calculated to give a starch loading of 10 pounds of dry starch per ton of mud, is added either to the caustic digestion liquor prior to digestion of the bauxite, or to the digester pulp prior to precipitation of the alumina.

The following specific example is illustrative of the novel process of sedimentation of this invention, as applied to bauxite extraction, but it is to be understood that the example is not otherwise to be regarded as limiting.

*Example 1*

Finely ground Haitian bauxite ore analyzing 21% total water, 49% aluminum oxide, 24% iron oxide, 2% silica, 4% titanium dioxide, on the dry basis is fed into a digester consisting of a large steel tank heated by steam and provided with an agitator. A hot solution of caustic soda furnishing sufficient NaOH to produce a liquor containing about 90 grams of aluminum oxide per liter, based upon the alumina content of the ore, is admixed with the bauxite, and the digestion is carried out under pressure, for a period of 30–45 minutes at a temperature of 390° F. Upon completion of the digestion, the liquor and digested pulp is transferred to a flash tank to reduce the pressure to atmospheric, and then to sedimentation or thickening tanks where the red mud is to settle out. There is added to the pulp in the settling tanks a quantity of homogenized gelatinized starch (low grade corn starch, Hi-Starch) prepared as disclosed previously, and sufficient to furnish a starch loading of 10 pounds of dry starch per ton of mud. The insolubles settle rapidly, the settling rate being 6.6 feet per hour. A high degree of compaction is obtained, the ratio of liquor to solid being 4.4. The sedimented solids are washed by continuous counter-current decantation methods (CCD). The clarified liquor is filtered through filter presses using cotton cloth fibers, and then sent to precipitation tanks for precipitation of the alumina content by applying a seed charge of hydrated alumina, in accordance with conventional procedures. The liquor remaining after precipitation is concentrated, fortified with caustic soda, and returned to the digesters for recycling.

*Example 2*

120.5 grams of Jamaican bauxite was digested with one liter of caustic soda solution from the Bayer plant containing about 230 g.p.l. NaOH as $Na_2CO_3$, 70 g.p.l. $Al_2O_3$ and 275 g.p.l. total $Na_2CO_3$. The charges of bauxite and liquor were taken in the correct proportion to give a discharge ratio of $Al_2O_3$ to NaOH (reported as $Na_2CO_3$) of about 0.60. The bauxite and liquor slurry were heated in a closed bomb for 30 minutes at 390° F. while the bomb was rotated. At the end of the digestion period, the contents of the bomb were blown off into a tank.

The calculated weight of 5% starch suspension (calculated to give a starch loading of 10 pounds of dry starch per ton of mud) was added to sufficient water to dilute an amount of the blown off slurry to 215 g.p.l. total $Na_2CO_3$ and to have 1 liter total volume. The diluted starch solution was divided into two equal portions. One portion of the starch suspension was added to a 1-liter graduated glass cylinder. Mud slurry from the bomb digest was added to the glass cylinder. The other half of the starch suspension was now added and the total volume now would be 1 liter. Two strokes of a plunger were given to mix the starch suspension with the mud slurry. The glass cylinder was then placed in a water bath at 210° F. ±2° F. Rakes were placed in the mud slurry and rotated at 3 r.p.m.

(a) *Settling rate.*—The time taken for the liquor-solid line to reach from 900 down to 500 ml. was noted.

The settling rate was calculated by dividing the distance traversed by the liquor-solid line from 900 ml. to 500 ml., expressed in feet, by the time taken to cover that distance.

The settling rate thus was expressed as feet/hour. The higher the settling rate, the faster would be separation of insoluble solid from the slurry and therefore the lesser would be area required in a commercial settler.

(b) *Compaction.*—The settled volume of the mud slurry at 90 minutes was noted. The supernatant liquor was decanted off; the mud was filtered, washed, dried and weighed. The densities of the supernatant liquor and of the dried mud were determined. The compaction was then calculated as the ratio of weight of the liquor in the settled mud to the dried weight of washed solids, as shown below:

$$\text{Compaction (liquor to solid ratio)} = \frac{dl\left(Sv - \frac{Wm}{dm}\right)}{Wm}$$

$dl$ = liquor density at settling temperature.
$Sv$ = mud slurry volume at the end of settling period.
$Wm$ = mud weight (washed, dry).
$dm$ = absolute density of mud (3.75 gm./cc.).

The lower liquid to solid weight ratio, the higher is the effectiveness of starch as a flocculant since a lower proportion of liquor would be removed with the settled mud. Better compaction also results in less height requirement for settlers plus CCD washers.

(c) *Settling rate and compaction of diluted slurries.*—The method for determination of settling rate and mud compaction in settlers was previously described. In order to simulate settling conditions in CCD washers, the following procedure was used:

At the end of 90-minute period, the supernatant liquor was decanted from the mud. The compacted mud at the bottom of the cylinder was given 30 rapid strokes with a plunger agitator to simulate pumping of settled mud from a primary settler to a washer settler. Part of the supernatant liquor was diluted with boiling water and added back to the mud slurry so that the liquor concentration was approximately 80 g.p.l. NaOH expressed as $Na_2CO_3$. The slurry was redispersed by 2 plunger strokes and allowed to settle for 60 minutes. The settling rate data was taken. The mud volume after 60 minutes was noted. At the end of 60 minutes, sufficient supernatant liquor was poured off and replaced with boiling water to give a liquor concentration of about 50 g.p.l. NaOH as $Na_2CO_3$. The slurry was redispersed by 2 plunger strokes and allowed to settle for 30 minutes. The settling rate data were taken as before and the mud volume after 30 minutes settling was noted.

The supernatant liquor was decanted off, the mud was filtered off, washed, dried and weighed. In each settling test, the supernatant liquor densities were determined at the settling temperature. The combined effect was to simulate CCD washer action.

The compactions of the settled muds were calculated in each settling test as shown under (b).

*Example 3*

Highly refined starch (Milo Maize) and crude-milled corn flour (Hi-Starch brand) were prepared by both the conventional (control) method and by the homogenization (Osterizer) method and tested according to the procedures given above. The results were as follows:

The homogenized Milo Maize prepared according to the method of the invention gave remarkably high settling rates and good compaction of settled mud. Hi-Starch which under control method of preparation was useless as a flocculant, gave almost as good settling rate and compaction as Milo Maize when homogenized by this invention. Hi-Starch sells for about 4¢/pound; Milo Maize about 7¢/pound. The beneficial effects of the homogenization carry on through the washing steps.

*Example 4*

[All 10 lbs./ton mud starch loading]
(1) 5% MILO-MAIZE SOLUTION

| Treatment | Viscosity, cps. | Settling Rate, ft./hr. | 90 Min. Compaction Liquid to Solid Ratio |
|---|---|---|---|
| Control Sample (Causticized Starch) | 400 | 2.8 | 5.0 |
| Starch Treated in Charlotte Colloid Mill | 145 | 6.1 | 4.6 |
| Starch Treated in Manton-Gaulin Mill | 100 | 4.5 | 4.2 |

(2) 5% HI-STARCH SOLUTION

| Treatment | Viscosity, cps. | Settling Rate, ft./hr. | 90 Min. Compaction Liquid to Solid Ratio |
|---|---|---|---|
| Control Sample (Causticized Starch) | 1,000+ | 0.40 | 18.0 |
| Starch Treated in Rapisonic Mill | 116 | 2.9 | 5.0 |
| Starch Treated in Charlotte Mill | 166 | 3.9 | 4.6 |
| Starch Treated in Manton-Gaulin Mill | 45 | 6.1 | 3.8 |

It is obvious from Example 4, that irrespective of the type of homogenizer used, if the starch suspension is well homogenized, its effectiveness as a flocculant will be increased considerably. The low-grade starch (Hi-Starch) can be rendered largely equal in its flocculating power to the high-grade starch by treatment through some standard commercial homogenizers. Even though only four homogenizers have been tried to prepare the starch suspension, there is no doubt that other homogenizers using the same or similar principles or combinations thereof, would be equally effective in preparing starch suspension as a flocculant, according to this invention.

*Example 5*

Another unexpected result obtained by using the starch treated according to the method of this invention, is its ability to overcome or partially nullify the non-flocculating characteristics of some Bayer liquors. It has been the experience of alumina producers using the Bayer process and sedimentation for the separation of red mud from the sodium aluminate solution, that sometimes for no obvious reason the mud slurry does not settle with the normal dosage of starch solution but requires heavy starch dosages thereby considerably increasing the cost of sedimentation operation. And even so, occasionally large reduction in plant output has been necessary because of poor settling even with high starch dosages.

| Starch | Viscosity,[1] cps. | Lbs. of Starch/ Ton Mud | Primary Settling | | Settling at 80 g.p.l. NaOH as $Na_2CO_3$ | | Settling at 50 g.p.l. NaOH as $Na_2CO_3$ | |
|---|---|---|---|---|---|---|---|---|
| | | | Settling Rate, Ft./Hr. | 90 Min. L:S Ratio | S.R., Ft./Hr. | 60 Min. L:S Ratio | Ft./Hr. | L:S Ratio |
| Milo Maize (Control) | 580 | 10 | 1.8 | 5.4 | 4.3 | 7.8 | 6.3 | 5.8 |
| Milo Maize (Osterizer) | 90 | 10 | 6.4 | 3.6 | 26.0 | 3.3 | 28.0 | 2.8 |
| Hi-Starch (control) | | 10 | Essentially no settling | | | | | |
| Hi-Starch (Osterizer) | 90 | 10 | 4.8 | 3.8 | 16.0 | 3.6 | 15.0 | 3.7 |

[1] Viscosity determined by a Brookfield viscosimeter using No. 1 spindle and 6 r.p.m. at 80° F.

The data shown below give the results obtained on using homogenized starch on three different liquors.

| Liquor | Starch prepared | Starch loading, lbs./ton mud | Settling rate, ft./hr. | Consolidation liquor to solid ratio |
|---|---|---|---|---|
| A | Causticized Control Starch (milo maize). | 10 | 3.9 | 4.9 |
| | Charlotte Mill Homogenized milo maize. | 10 | 6.1 | 4.6 |
| | Charlotte Mill Homogenized Hi-Starch. | 10 | 6.6 | 4.4 |
| B | Causticized Control Starch (milo maize). | 10 | 1.8 | 8.5 |
| | Charlotte Mill Homogenized milo maize. | 10 | 4.1 | 4.6 |
| | Charlotte Mill Homogenized Hi-Starch. | 10 | 2.8 | 6.7 |
| C | Causticized Control Starch (milo maize). | 10 | 2.8 | 5.0 |
| | Charlotte Mill Homogenized Hi-Starch. | 10 | 5.7 | 4.6 |

These results indicate that in spite of the wide variation in liquor characteristics with the same conventional starch preparation yielding (from 1.8 to 3.9 settling rate; and compactions from 4.9 to 8.5 liquor solids ratio), the homogenized starch with its higher flocculating power can give a more consistent satisfactory settling rate and consolidation of the red mud, for the smoother operation of the settlers.

What is claimed is:

1. Method for the separation of the alkali-insoluble constituents of aluminous ores of the bauxite type from alkaline bauxite digestion liquor in which they are suspended which comprises adding to the suspension a flocculant comprising a homogenized gelatinized starch, said starch having been first gelatinized and then homogenized by mechanical disruption of the starch structure by means of high speed shearing and tearing stresses to form a fine aqueous suspension of said starch corresponding to a starch loading between about 3 and about 20 pounds per ton of insoluble constituents, and then separating the sedimented insoluble constituents from the digestion liquor.

2. The method of claim 1 in which the bauxite is a Caribbean bauxite.

3. The method of claim 1 in which the starch is a low-grade impure starchy material.

4. The method of claim 1 in which the starch is a low-grade impure corn starch.

5. Process for the extraction of alumina values from aluminous ores of the bauxite type which comprises digesting the ground aluminous ore with an aqueous solution of an alkali to obtain a slurry comprising a suspension of the alkali-insoluble constituents of said ore in the digestion liquor, adding to the suspension a flocculant comprising a homogenized gelatinized starch, said starch having been first gelatinized and then homogenized by mechanical disruption of the starch structure by means of high speed shearing and tearing stresses to form a fine aqueous suspension of said starch corresponding to a starch loading between about 3 and about 20 pounds per ton of insoluble constituents, separating the sedimented insoluble constituents from the digestion liquor, and recovering the alumina from said digestion liquor by precipitation.

References Cited in the file of this patent

UNITED STATES PATENTS

| | | |
|---|---|---|
| 1,947,295 | Jezsa | Feb. 13, 1934 |
| 1,979,257 | Giesecke | Nov. 6, 1934 |
| 2,105,052 | Oltmans | Jan. 11, 1938 |
| 2,280,998 | Brown | Apr. 28, 1942 |
| 2,417,969 | Caesar et al. | Mar. 25, 1947 |
| 2,468,207 | Kerr | Apr. 26, 1949 |
| 2,635,068 | Rees | Apr. 14, 1953 |
| 2,935,377 | Jones | May 3, 1960 |

FOREIGN PATENTS

| | | |
|---|---|---|
| 481,499 | Great Britain | Mar. 7, 1938 |
| 522,691 | Great Britain | June 25, 1940 |